(12) United States Patent
Sieger

(10) Patent No.: US 8,932,005 B2
(45) Date of Patent: Jan. 13, 2015

(54) ARCHIMEDEAN MODULAR / MULTI-AXIS ROTOR (AMR)

(76) Inventor: Charles Martin Sieger, Miami, FL (US)

( * ) Notice: Subject to any disclaimer, the term of this patent is extended or adjusted under 35 U.S.C. 154(b) by 399 days.

(21) Appl. No.: 13/444,306

(22) Filed: Apr. 11, 2012

(65) Prior Publication Data

US 2013/0272894 A1    Oct. 17, 2013

(51) Int. Cl.
```
F03D 5/00      (2006.01)
F03D 3/00      (2006.01)
F03D 1/02      (2006.01)
F03D 3/02      (2006.01)
F03D 3/06      (2006.01)
F03B 3/12      (2006.01)
```
(52) U.S. Cl.
CPC F03D 5/005 (2013.01); F03D 1/02 (2013.01); F03D 3/02 (2013.01); F03D 3/061 (2013.01); F03B 3/121 (2013.01); *F05B 2240/243* (2013.01); *F05B 250/25* (2013.01); *Y02E 10/70* (2013.01); *Y02E 10/223* (2013.01)
USPC .............................. 415/71; 416/122; 416/176

(58) Field of Classification Search
USPC .......... 290/43, 44, 54, 55; 415/66, 71, 72, 73, 415/74, 75, 76, 905, 908; 416/120, 122, 416/123, 132 R, 132 B, 176, 177, 244 R
See application file for complete search history.

(56) References Cited

U.S. PATENT DOCUMENTS

| | | | | |
|---|---|---|---|---|
| 4,245,958 | A | * | 1/1981 | Ewers ....................... 416/197 A |
| 4,500,259 | A | | 2/1985 | Schumacher |
| 4,708,592 | A | | 11/1987 | Krolick et al. |
| 5,313,103 | A | | 5/1994 | Hickey |
| 5,642,984 | A | * | 7/1997 | Gorlov .......................... 416/176 |
| 7,364,406 | B2 | | 4/2008 | Kinkaid |
| 2008/0273974 | A1 | * | 11/2008 | Becker ............................. 416/7 |
| 2009/0214339 | A1 | | 8/2009 | Poleacov et al. |
| 2013/0272894 | A1 | * | 10/2013 | Sieger ....................... 416/241 R |
| 2013/0343891 | A1 | * | 12/2013 | Rajakaruna et al. .......... 416/176 |

* cited by examiner

*Primary Examiner* — Edward Look
*Assistant Examiner* — Christopher R Legendre
(74) *Attorney, Agent, or Firm* — Malloy & Malloy, P.L.

(57) ABSTRACT

An Archimedean Modular/Multi-Axis Rotor (AMR) is a wind/fluid driven electrical generating device as described which utilizes a single foil rotor and appears in an elongated Archimedean curve tapering at its ends. A plurality of AMR's can be assembled in a multiplicity of tetrahedral or other 3-dimensional type structures that generate electric power. These structures would be manufactured to facilitate easy shipping, handling, assembly, erection and maintenance. The AMR is quiet (no prop buffeting), bird friendly, can accommodate any varying orientations to the wind/fluid direction and continues to operate even when in the direct shadow of adjacent AMR rotors.

1 Claim, 6 Drawing Sheets

ARCHIMEDEAN MODULAR / MULTI-AXIS ROTOR (AMR)

CROSS-REFERENCES TO RELATED APPLICATIONS

"None"

REFERENCES
U.S. Patent Documents

| | | | |
|---|---|---|---|
| 1,100,332 | June 1914 | J. B. Smith | |
| 1,697,574 | January 1929 | S. J. Savonius | |
| 3,941,504 | March 1976 | Snarbach | 416/197 A |
| 4,086,026 | April 1978 | Tamanini | 416/176 |
| 4,236,866 | December 1980 | Zapata Martinez | 415/2 R |
| 4,293,274 | October 1981 | Gilman | 416/51 |
| 4,500,259 | February 1985 | Schumacher | 416/122 |
| 4,708,592 | November 1987 | Krolick et al. | 416/176 A |
| 4,718,821 | January 1988 | Clancy | 416/44 |
| Des.300932 | May 1989 | Sikes | D15/1 |
| 4,957,517 | September 1990 | Linnert | 55/184 |
| 5,137,417 | August 1992 | Lund | 415/4.1 |
| 5,313,103 | May 1994 | Hickey | 290/54 |
| 5,386,146 | January 1995 | Hickey | 290/55 |
| 5,405,246 | April 1995 | Goldberg | 416/227 A |
| 5,494,407 | February 1996 | Benesh | 416/197 A |
| 5,760,515 | June 1998 | Burns | 310/115 |
| 5,810,289 | September 1998 | Sager | 244/6 |
| 6,036,443 | March 2000 | Gorlov | 416/176 |
| 6,283,711 B1 | September 2001 | Borg et al. | 416/135 |
| 6,428,275 B1 | August 2002 | Jaakkola | 416/176 |
| 6,948,910, B2 | September 2005 | Polacsek | 416/1 |
| 7,008,171 B1 | March 2006 | Whitworth | 415/4.2 |
| 7,109,599 B2 | September 2006 | Watkins | 290/55 |
| 7,132,760 B2 | November 2006 | Becker | 290/55 |
| 2006/0257240 A1 | November 2006 | Naskali et al. | 415/4.4 |
| 7,156,609 B2 | January 2007 | Palley | 415/4.2 |
| 7,364,406 B2 | April 2008 | Kinkaid | 416/132 B |
| 7,371,135 B1 | May 2008 | Vanderhye et al. | 440/8 |
| 2008/0258468 A1 | October 2008 | Fuller | 290/55 |
| 2009/0025775 A1 | January 2009 | Parra Cebrian et al. | 136/230 |
| 7,494,315 B2 | February 2009 | Hart | 415/71 |
| D594,818 S | June 2009 | Doucet | D13/115 |
| 2009/0189395 A1 | July 2009 | Ryynanen at al. | 290/53 |
| 2009/0214339 A1 | August 2009 | Poleacov et al. | 416/1 |
| D600,641 S | September 2009 | Starck | D13/115 |
| 2009/0257880 A1 | October 2009 | Clark | 416/223 R |
| D610,542 S | February 2010 | Raisanen et al. | D13/115 |
| 2010/0215492 A1 | August 2010 | Domenech Barcons | 416/10 |
| 2010/0247320 A1 | September 2010 | Steele | 416/223 R |
| 2010/0327596 A1 | December 2010 | Williams | 290/54 |
| 2011/0006542 A1 | January 2011 | Burrell, IV | 290/55 |
| 2011/0006543 A1 | January 2011 | Hu | 290/55 |
| 2011/0027087 A1 | February 2011 | Rokeby-Thomas | 416/176 |
| 2011/0027084 A1 | February 2011 | Rekret | 416/126 |
| 2011/0037271 A1 | February 2011 | Scheinman | 290/55 |
| 7,896,609 B2 | March 2011 | Mitchell et al. | 415/4.2 |
| 2011/0081243 A1 | April 2011 | Sullivan | 416/120 |
| D637,555 S | May 2011 | Rodriguez | D13/115 |
| D638,358 S | May 2011 | Sauer, Jr. | D13/115 |
| 7,948,110 B2 | May 2011 | Morgan et al. | 290/55 |
| 2011/0121580 A1 | May 2011 | Morgan et. al. | 290/55 |

STATEMENT REGARDING FEDERALLY SPONSORED RESEARCH OR DEVELOPMENT

This invention was not made under contract or funding of any kind by/and or with any agency of the United States government.

THE NAMES OF THE PARTIES TO A JOINT RESEARCH AGREEMENT

"Not Applicable"

INCORPORATION-BY-REFERENCE OF MATERIAL SUBMITTED ON A COMPACT DISC

"Not Applicable"

BACKGROUND OF THE INVENTION

1. Field of the Invention

The invention relates to electric power generating modular structures that contain a plurality of single foil rotors, that are wind/fluid driven and operate in a multi-axial orientation and rotate clockwise or counter clockwise to wind/fluid pressures. The invention described herein is an Archimedean Modular/Multi-Axial Rotor (AMR).

2. Background Art

Wind/fluid powered electricity generating devices are a significant source of renewable electric energy. Many of the prior arts are propeller type perpendicularly aligned to the wind/fluid or multi-bladed Savonius or Darius type vertical rotors. Propeller type devices of prior arts buffet the wind/fluid causing objectionable noise, require significant wind/fluid velocities, work efficiently in a relatively narrow range of wind/fluid velocities and have many associated problems involving complex mechanical, heat and electrical solutions obviating inexpensive products.

The savonius models, different than propeller type devices, only work generally in a vertical or horizontal position whereby they are typically used singularly in a constructed structure. In addition, many of the prior arts are inefficient in recovery and are a singular structure with one rotational axis. The prior arts: U.S. Pub. 2009/0189395A1 to Ryynanen et. al., U.S. Pat. No. 7,494,315B2 to Hart., U.S. Pat. No. 6,428,275B1 to Jaakkola., U.S. Pat. No. 6,036,443 to Gorlov., contain multiple foils and a standalone rotor and do not necessarily take advantage of a multi-axis orientation to wind/fluid directions and are not modular in a composite structure.

The prior arts: U.S. Pub. 2009/0214339A1 to Poleacov et. al., U.S. Pat. No. 7,364,406B2 to Kinkaid., U.S. Pat. No. 5,313,103 to Hickey., U.S. Pat. No. 4,708,592 to Krolick et. al., U.S. Pat. No. 4,500,259 to Schumacher., are single foil wind rotors different in configuration and without tetrahedral modular capability as well.

With the embodiment of the AMR as an incremental part of a larger structure, a plurality of AMR's can increase electrical output occupying a smaller area of space/land than existing technologies. Using a plurality of AMR's that can be removed from a structural frame (e.g. tower) creates a basis of simplicity of manufacturing, easy incremental maintenance, and retrofitting. In addition, the aggregation of a plurality of AMR's increase the effective area under wind/fluid pressures of the total compact structural assembly. The structural frames' total area under the influence of wind/fluid pressures is greatly increased and not solely concerning itself with the ultimate "Betz" ability of each individual AMR rotor.

BRIEF SUMMARY OF THE INVENTION

The invention described herein is an Archimedean Modular/Multi-Axis Rotor (AMR) wind/fluid driven device which utilizes a single foil attached continuously to a structural tube in an Archimedean type spiral elongated and tapered as described herein. Wherein upon rotation the resultant torque has electrical generating abilities. A plurality of assembled rotors (AMR's) used to create tetrahedral structures can be assembled and lifted in a plurality of larger structures to create a structurally aggregated electric generating device or series of devices. The structures' operation, maintenance, and erection are facilitated in an embodiment of tetrahedral forms being assembled by a plurality of AMR's, although other 3-dimensional geometries can be an alternative embodiment of the AMR's.

BRIEF DESCRIPTION OF THE SEVERAL VIEWS OF THE DRAWINGS

The accompanying drawings, which are incorporated in and form part of the specification, illustrate embodiments of the present invention and, together with the description, serve to explain the principles of the invention. The drawings provided herein are not drawn to scale.

INDEX OF REFERENCE NUMERALS

Figure 1:
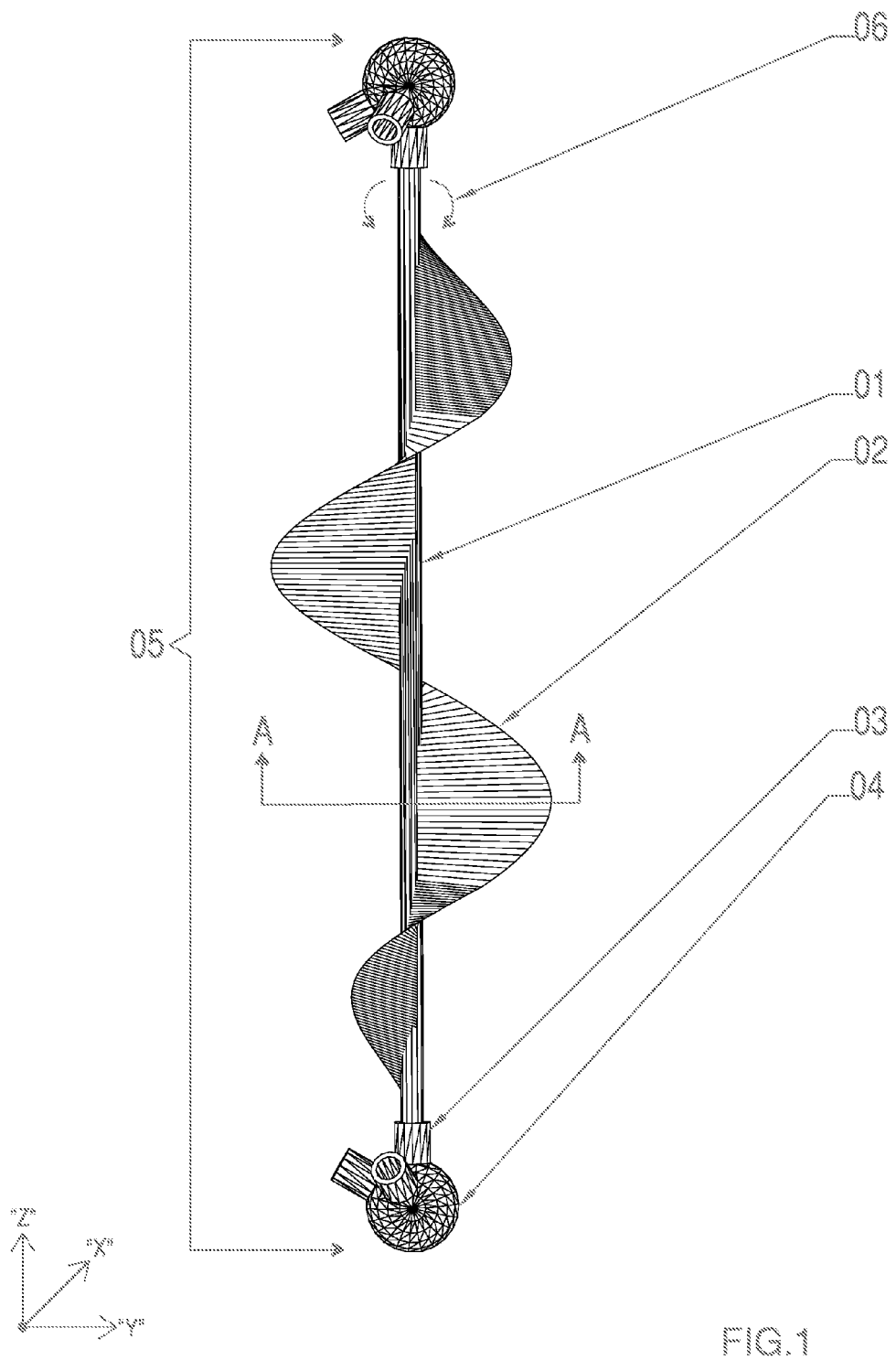
FIG. 1 is a schematic elevation illustration of an embodiment of a singular AMR of the invention's configuration.
Figure 2:
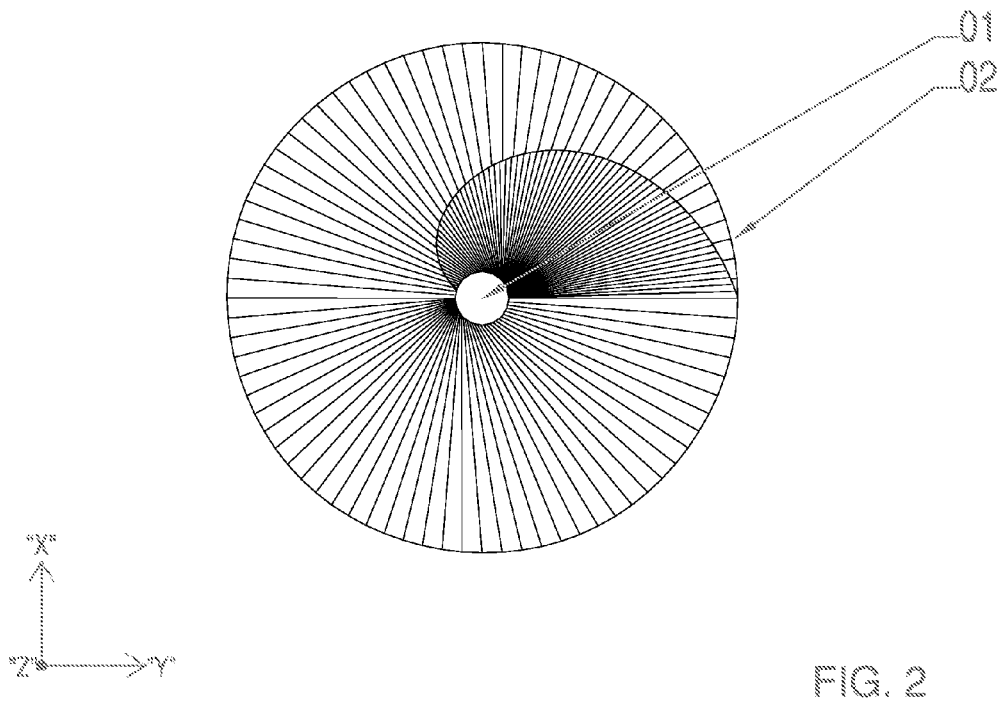
FIG. 2 is a schematic plan illustration of an embodiment of a singular AMR of the invention's configuration.
Figure 3:
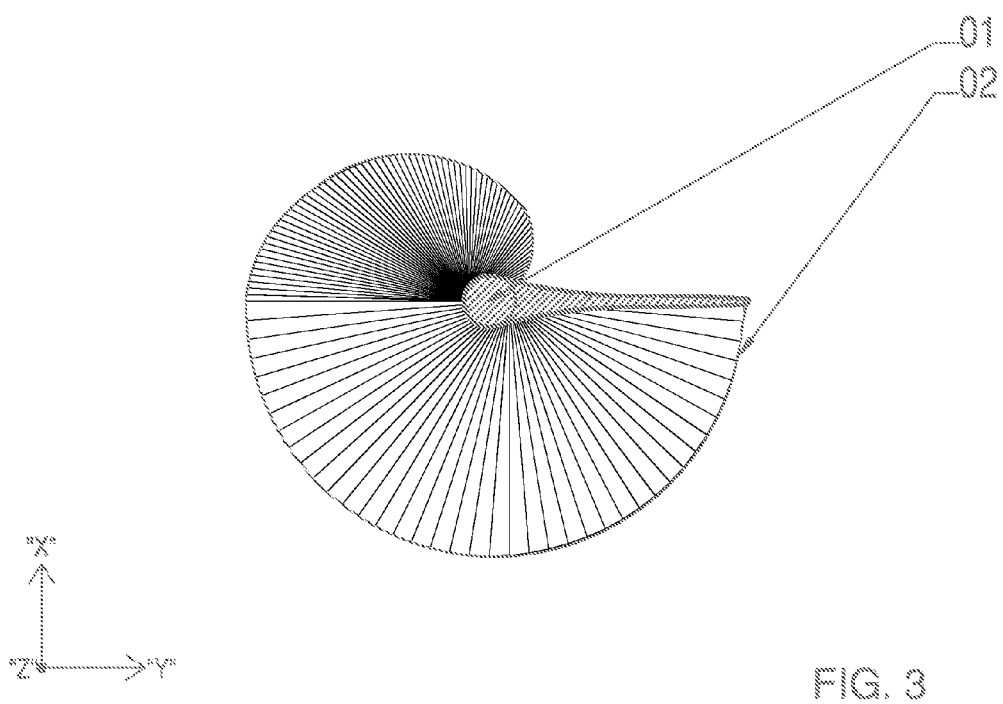
FIG. 3 is a schematic section of the AMR foil and structural tube of the invention's configuration.
Figure 4:
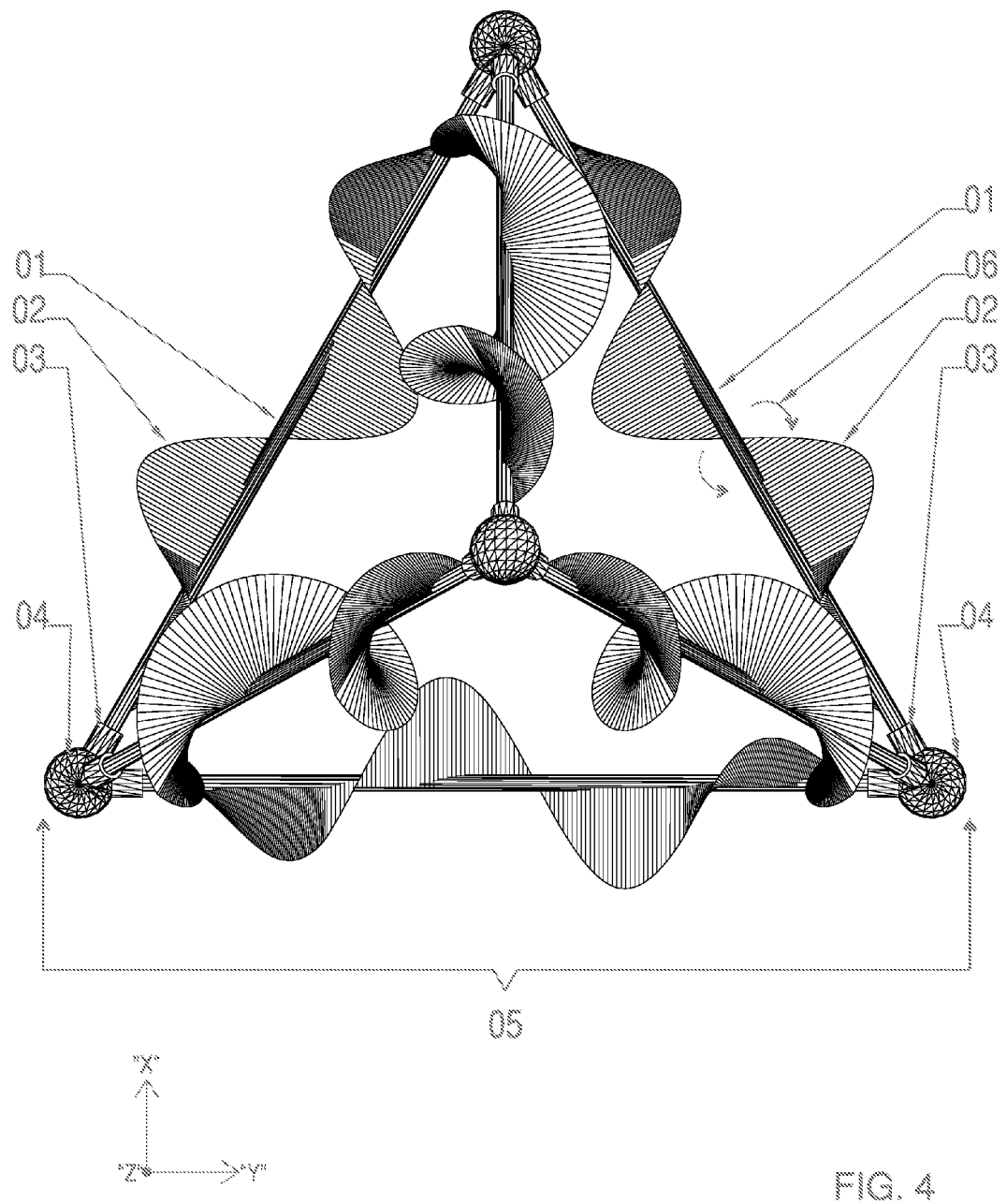
FIG. 4 is a schematic isometric illustration of a tetrahedron structure assembled from six AMR's as an example of a preferred embodiment configuration.
Figure 5:
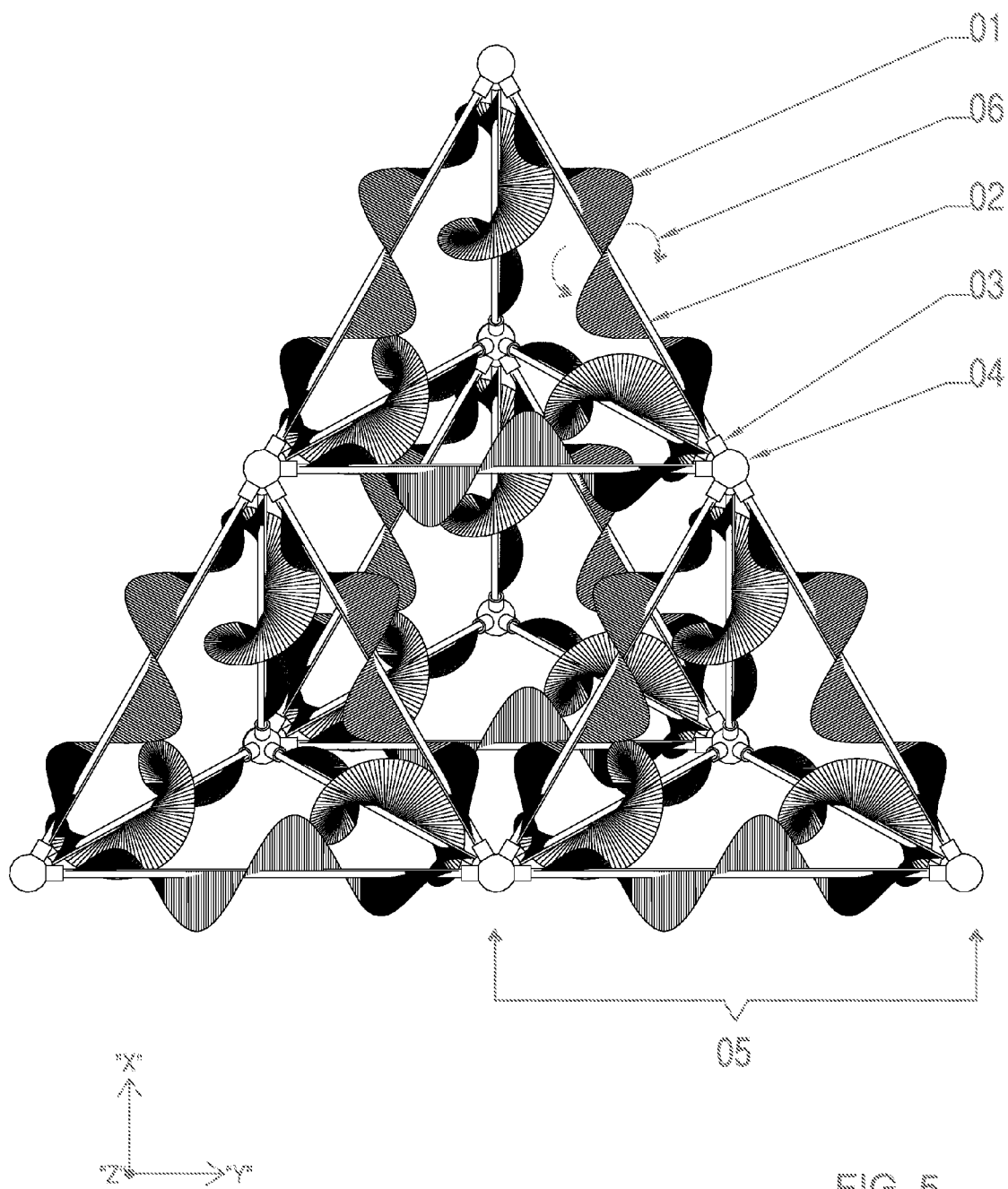
FIG. 5 is a tetrahedral pyramid assembled by a plurality of AMR's as an example of another preferred embodiment configuration.
Figure 6:
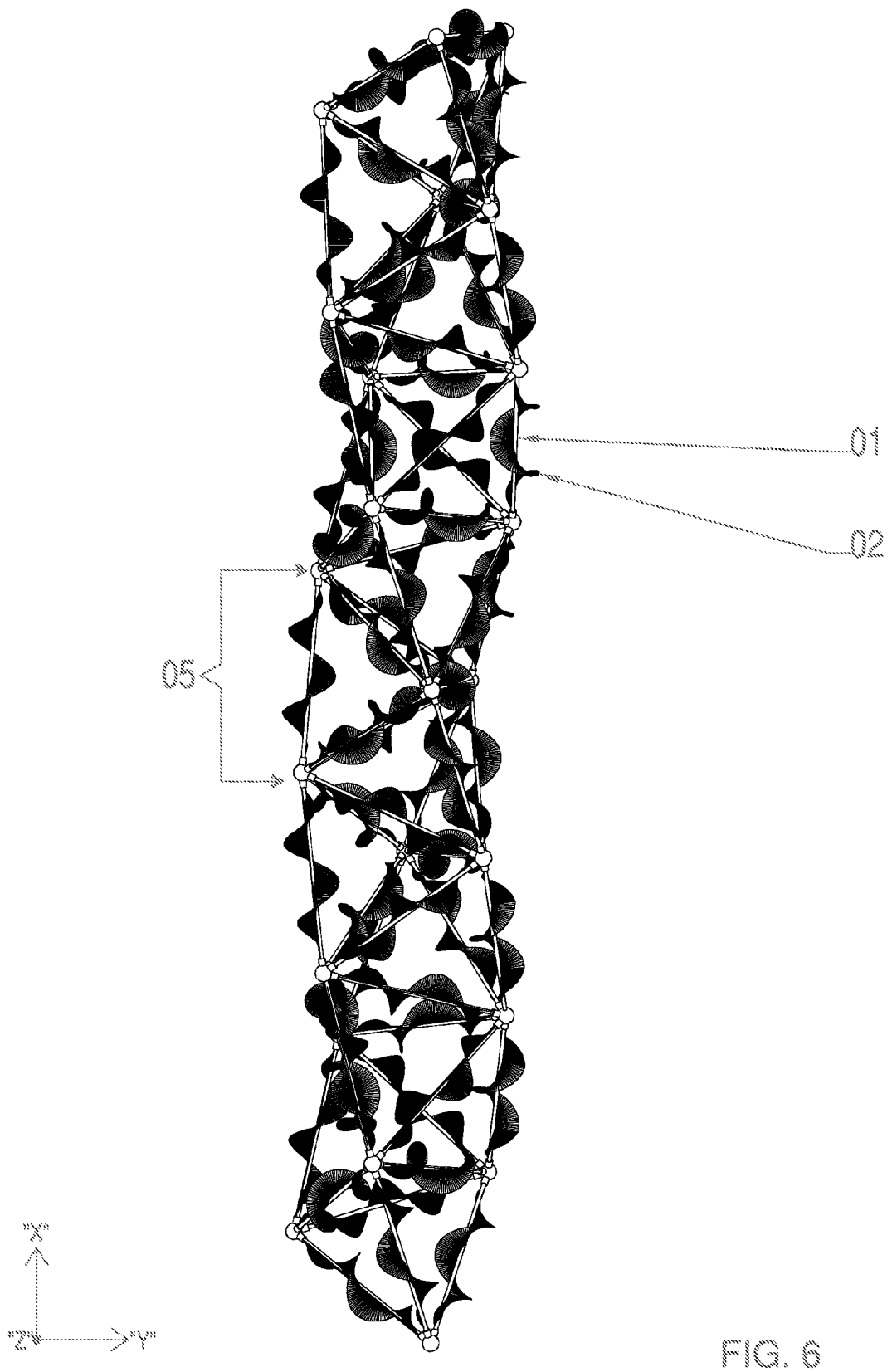
FIG. 6 is a schematic isometric illustration of a tetrahedral tower structure assembled by a plurality of AMR's as an example of another preferred embodiment configuration.
Figure 7:
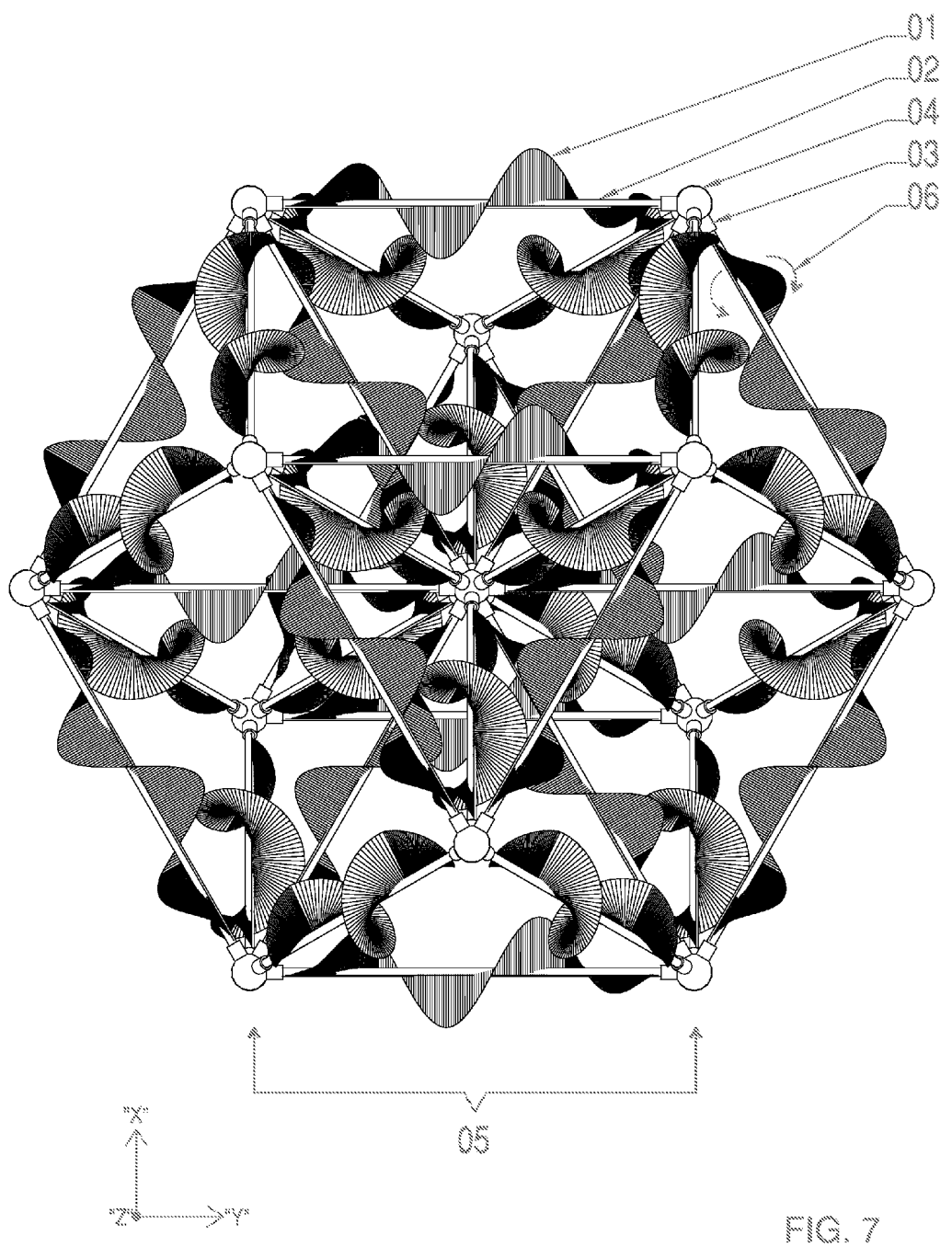
FIG. 7 is a schematic isometric illustration of a tetrahedral structure as an example of another preferred embodiment configuration.

01 Continuous structural tube
02 Tapered spiral foil
03 Structural connection (of prior arts)
04 Electrical generator device (of prior arts)
05 Archimedean Modular/Multi-Axis Rotor (AMR)
06 Bi-directional typical AMR rotation (clockwise or counter clockwise)

DETAILED DESCRIPTION OF THE INVENTION

The invention described herein is an Archimedean Modular/Multi-Axis Rotor (AMR) (05) wind/fluid driven electrical generation device which utilizes a single foil attached continuously to a structural tube in an Archimedean type spiral, elongated and tapered as described herein. A plurality of assembled rotors (AMR) (05) used to create a tetrahedral structure can be assembled and lifted in a larger plurality to create a structurally aggregated wind generating device or series of devices. The structures' operation, maintenance, and erection are facilitated in an embodiment of tetrahedral forms being assembled by a plurality of AMR's (05). Other 3-dimensional geometries can also be created employing AMR's (05) of the same or differential lengths.

The AMR (05) may be manufactured inexpensively since there are two parts that can be combined into one and molded in the embodiments' described configuration.

The individual AMR's (05) tapered ends allows each individual rotor to clear each other as they rotate within the tetrahedral structure. The maximum area of foil (02) occurs near the center of each individual AMR (05). The foil (02) having its cross sectional area larger towards the center of the AMR (05) increases the structural tube's (01) bending moment resistance capability when the foil (02) becomes composite with the tube (01). The AMR (05) rotor may have an individual vertical configuration with a foil (02) twist along its axis of at least 180 degrees, although the AMR's (05) orientation angle is multi-axial to the wind/fluid, the AMR (05) possesses the rotational ability to be bi-directional (clockwise and counter clockwise).

The Archimedean helical configuration facilitates self-starting and smooths the torque output between each full revolution. The helical form of the single rotor foil (02) on each AMR (05) as described herein; the tapered configuration at each end; all contribute to the formation of a continuous moving low-pressure lift area that migrates along the leeward surface of the foil as the AMR (05) turns. This lift at any given instant is at the appropriate wind/fluid angle "angle of attack" regardless of the wind/fluid pressures or axis orientation of the AMR (05) to the real or apparent pressures (the apparent wind/fluid pressures being in constant reorientation during wind/fluid velocity fluctuations). This instant "angle of attack" creates a low pressure lift on the leeward side of the AMR (05) adding to the windward pressure side, resulting in an increase of torque.

As the lift area migrates along the AMR's foil's (02) chord length the AMR (05) assists in establishing laminar flow in its instant time related vicinity of the appropriate "angle of attack".

The instant time related area of lift, on the low pressure side increases torque (and its consistency) throughout each full rotation of the AMR (05).

As indicated by a tested prototype, rotational velocity fluctuations are of a sinusoidal nature under a constant equal wind/fluid pressure as a result of the AMR's (05) lift accelerating rotation to a point in time the "angle of attack" breaches the inducement of lift and the AMR (05) slows and begins again to increase its speed as it recycles its lift approach. Also noted in a prototype tetrahedral configuration using two AMR's (05) that the pressure shadow from one AMR (05) to the other in a direct shadow overlap indicated only a minor decrease in rotational velocity of the AMR (05) in shadow. This minor shadow pressure degradation is what facilitates the AMR's (05) plurality aggregation in tetrahedral or other 3-dimensional structures.

The accumulation of a plurality of AMR's (05) electric generating power can be accomplished through the use of prior arts (04), e.g. electrical generation by elongated permanent magnet DC or AC generators, alternating current modified by pulse width modulation, RCL filters etc.

In one aspect the present embodiment of the AMR (05) is a rotor responsive to a fluid (e.g. wind or water) flowing not necessarily relative to its axis of rotation, or of singular rotational direction, unlike most wind/fluid power electrical generating devices.

What is claimed is:

1. An apparatus to provide a means of generating electrical energy in an environmentally clean and efficient manner comprising:
   a plurality of prefabricated Archimedean Modular/Multi-Axial Rotors (AMR's) responsive to a fluid, each AMR comprising:
   a) a plurality of continuously attached foils helically extending along an axis of rotation and tapered at each end, each foil further comprising:
      i) a lightweight material suitable for low frictional resistance, surface wear durability and/or UV radiation resistance, such as fiberglass, nylon, carbon fiber or rigid polymer, and
      ii) a cross section with a surface that is flat, concave and/or convex along its perimeter;

b) a plurality of structural tubes comprising a lightweight material such as fiberglass, carbon fiber, rigid polymer, or metal and/or alloys; and wherein each foil is sintered/bonded and/or affixed to a respective structural tube, and each structural tube is sintered/bonded and/or affixed to a structural connection device that allows clockwise and counterclockwise rotation; and wherein each structural tube drives at least one electrical generator;

wherein the plurality of AMR's are arranged to form a tetrahedral or other 3-dimensional configuration.

\* \* \* \* \*